(12) United States Patent
Patel et al.

(10) Patent No.: US 6,282,674 B1
(45) Date of Patent: Aug. 28, 2001

(54) APPARATUS AND METHOD FOR RETRIEVAL OF CIRCUIT STATE INFORMATION

(75) Inventors: Jayesh M. Patel, Austin; Maulin I. Patel, Williamson County, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/164,020

(22) Filed: Sep. 30, 1998

(51) Int. Cl.[7] ................................................. G06F 11/00
(52) U.S. Cl. .............................. 714/30; 714/49
(58) Field of Search ........................... 714/30, 45, 46, 714/49

(56) References Cited

U.S. PATENT DOCUMENTS

| | | | |
|---|---|---|---|
| 4,953,165 | * | 8/1990 | Jackson ................................... 714/44 |
| 5,724,505 | | 3/1998 | Argade et al. ................... 395/183.21 |

* cited by examiner

*Primary Examiner*—Robert Beausoleil
*Assistant Examiner*—Bryce Bonzo
(74) *Attorney, Agent, or Firm*—Winstead Sechrest & Minick, P.C.; Leslie A. Van Leeuwen

(57) ABSTRACT

Provided is an apparatus and method for remote retrieval of an integrated-circuit state according to the present invention uses a remote input/output ("RIO") processor with a test circuit interface, which in the preferred embodiment is the TAP 118. The test circuit interface is for electrically-coupling to an integrated circuit having a test circuit with at least one register for storing a state-information with respect to the integrated circuit. The RIO processor executes a program that instructs the RIO processor to retrieve the state-information in response to a request command. The retrieved state information is transmitted for analysis at a location remote from the computer system using a data-and-instruction communication device. A method of the present invention has a step of issuing a request command for state-information of the integrated circuit having, retrieving the state-information of the integrated circuit in response to the command request; and transmitting the state-information to a location remote from the integrated circuit such that the state-information is available for analysis by a service technician.

36 Claims, 3 Drawing Sheets

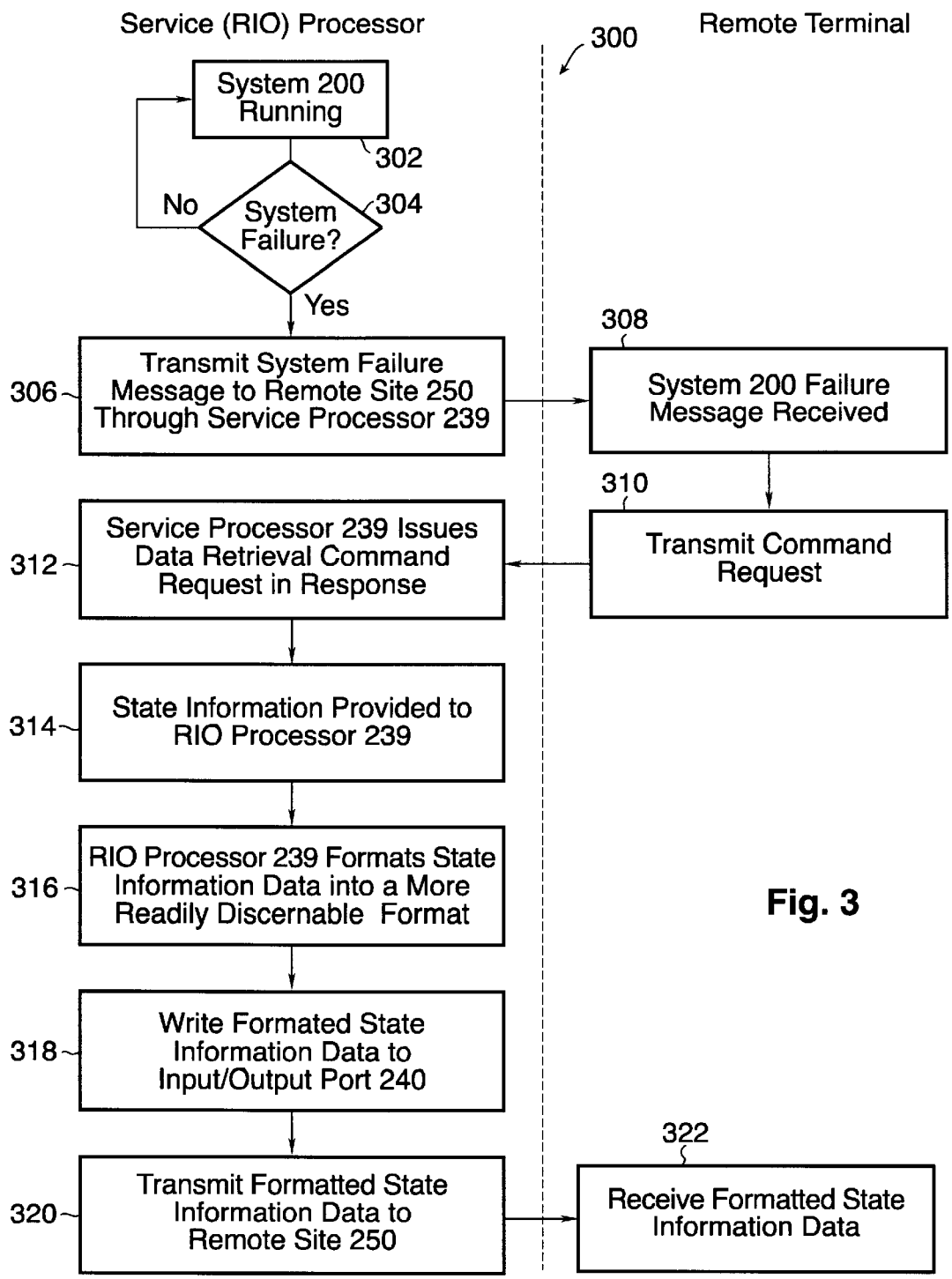

APPARATUS AND METHOD FOR RETRIEVAL OF CIRCUIT STATE INFORMATION

TECHNICAL FIELD

The present invention relates generally to the troubleshooting of computer errors, and in particular to remote state data retrieval of a computer hardware system outside a manufacturing environment.

BACKGROUND INFORMATION

While operating computer equipment, such as personal computers or computer servers, to provide Internet access, users would encounter system errors displayed as a general error message on the monitor of the computer system. These system errors could arise for any number of reasons, from computer program errors, from computer program conflicts with the computer components such as the microprocessor and the memory, or from a hardware error. Thus, a user that calls for service can only relay the information the computer gives them to a service technician. But to efficiently service a computer, the service typically needs additional information, such as circuit state information, and has had to go on-site to retrieve this information.

This circuit state information can be retrieved through test circuitry put in place for testing and component debugging purposes. A component circuit board may contain numerous integrated circuits (also known as "chips") having input/output ("I/O") pins for interconnecting various internal circuits of the chips. With the continual miniaturization of integrated circuitry, the number of pins have steadily increased. Testing of these interconnections and the associated I/O pins is a vital step in the design and manufacture of such circuit boards and chips.

One of the standards that has been implemented within the industry is JTAG (Joint Test Action Group) testing of an IEEE (Institute of Electrical & Electronics Engineers) 1149.1 standard-compliant device. The IEEE standard 1149.1 is described in detail in the *IEEE Standard Test Access Port and Boundary-Scan Architecture*.

The IEEE standard 1149.1 was developed to address the need to test components that were advancing in complexity, density, and packaging of semiconductor components. As a result, increased pin counts, reduced pin spacing, and inaccessible circuit nets had caused a general inability to apply common testing methods to verify proper operation of these components. In general, interconnect faults in chips, such as open circuits or short circuits, typically accounted for 75% or more of the manufacturing defects. There are many causes of opens and shorts: bent pins, excessive solder, insufficient solder, component misalignment, and others. The IEEE standard 1149.1 standard was formulated to provide a structured interconnect test and access method.

The IEEE standard 1149.1 consists of a 4-wire (optionally 5-wire) serial test bus with a standard protocol and a structured test technique called boundary scan. Boundary scan logic placed at the I/O pins of a component allows each pin to be controlled or observed for interconnect tests.

A ring architecture is provided by the IEEE 1149.1 architecture, which allows a simple interconnect and low gate count implementation of single board/card designs. Through this ring architecture, the IEEE standard 1149.1 had provided verification of functionality and correct interconnection of both compliant and non-compliant devices in a printed circuit board design, such as a computer motherboard. Under JTAG, testing was able to be performed without the presence of firmware by accessing the Test Access Port ("TAP"), and manipulating the process to imitate most of the bus signals for the board.

Apart from it original purpose of manufacturing defects testing, the IEEE standard 1149.1 had been used to provide a gateway to other capabilities such as design debug and validation, internal IC test, on-chip emulation, performance monitor logic, and system test features. Also, the IEEE standard 1149.1 had been used to access and control on-chip performance monitor and on-chip emulation logic.

Nevertheless, such test structures have not been available for on-demand access, either remotely or locally, so that a service technician can efficiently service the computer system.

Thus, a need exists for an apparatus and method for remote retrieval of circuit state information. A further need exists for an automated dial-in to a remote service center upon the occurrence of a computer system fault.

SUMMARY OF THE INVENTION

Accordingly, provided is an apparatus and method for remote retrieval of an integrated-circuit state according to the present invention using a remote input/output ("RIO") processor with a test circuit interface, which in an embodiment is the TAP. The test circuit interface is for electrically coupling to an integrated circuit having a test circuit with at least one register for storing a state-information with respect to the integrated circuit. The RIO processor executes a program that instructs the RIO processor to retrieve the state-information in response to a request command. The retrieved state information is transmitted for analysis at a location remote from the computer system using a data-and-instruction communication device. A method of the present invention has a step of issuing a request command for state-information of the integrated circuit having, retrieving the state-information of the integrated circuit in response to the command request, and transmitting the state-information to a location remote from the integrated circuit such that the state-information is available for analysis by a service technician.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 is a flow chart of the interaction between a service processor of a computer system with a remote site across a data-and-instruction communication device.

DETAILED DESCRIPTION

Figure 1:
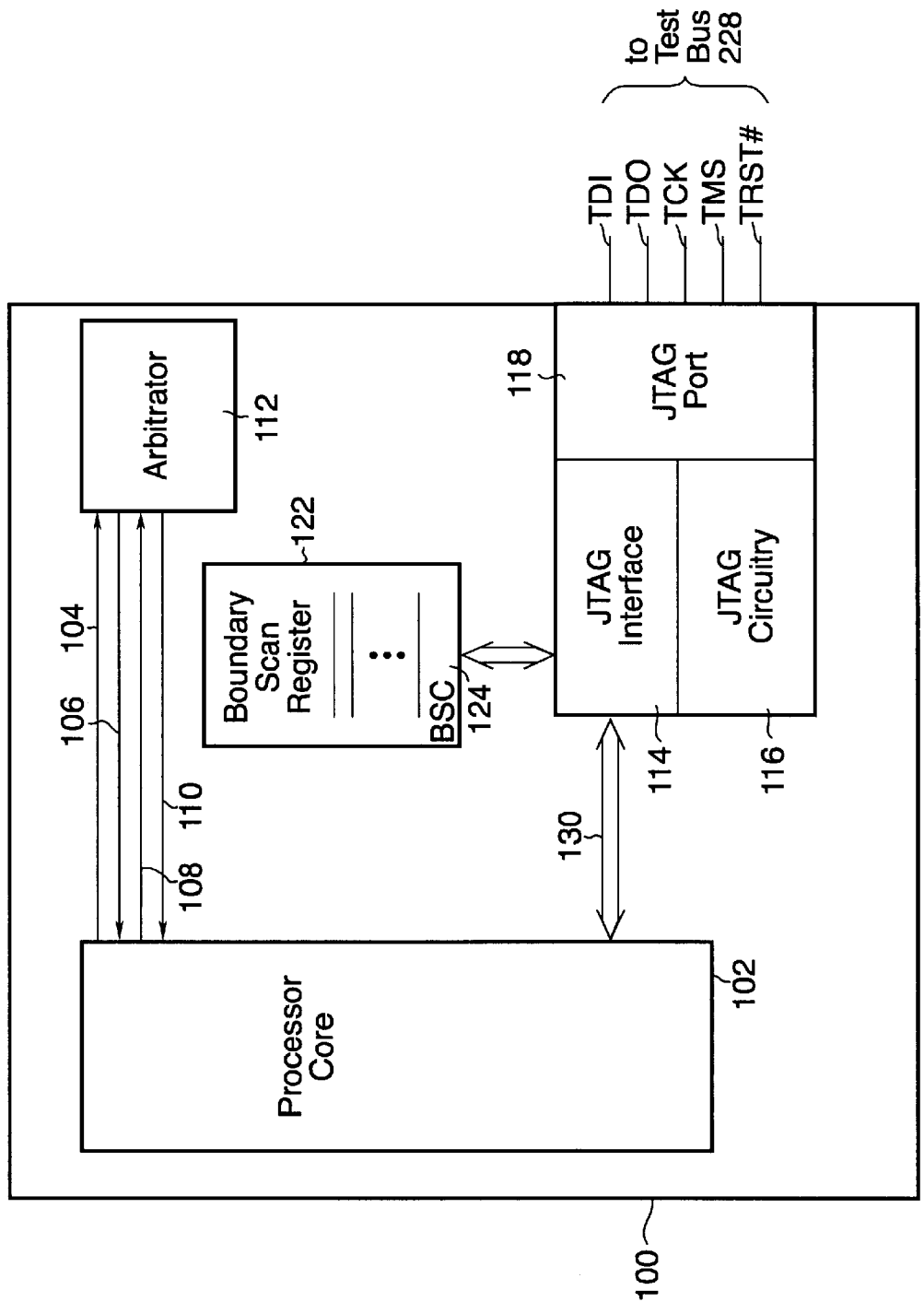
FIG. 1 is a block diagram of an integrated circuit having a standardized test circuit for storing state information data of the integrated circuit.

In the following description, numerous specific details are set forth to provide a thorough understanding of the present invention. It should be noted, however, that those skilled in the art are capable of practicing the present invention without such specific details. In other instances, well-known circuits have been shown in block diagram form in order not to obscure the present invention in unnecessary detail.

Although the present invention is described with reference to a specific embodiment of a digital microprocessor using a JTAG test access port ("TAP") for circuit-state information data output, it should be understood that the remote circuit state retrieval mechanism of the present invention can be adapted for use with other digital processing devices having comparable hardware capabilities, and serial data outputs including, by way of example, microprocessors, microcontrollers, and digital signal processors having limited bandwidth serial data outputs. Furthermore, the remote register state retrieval mechanism of the present invention can be adaptable to a test bus in communication with a plurality of semiconductor devices having a TAP. All such variations are intended to be included within the scope of the present invention. It will recognized that, in the drawings, only those signal lines and processor blocks necessary for the operation of the present invention are shown.

Referring to the drawings, depicted elements are not necessarily shown to scale, and like or similar elements are designated by the same reference numeral through the several views.

Referring to FIG. 1, shown is a block diagram of a digital microprocessor 100 having JTAG circuitry according to the IEEE standard 1149.1. A processor core 102 controls the operation of the microprocessor 100. The processor core 102 receives data and instructions via lines 106 and 110 from an arbitrator block 112, and outputs instruction and data addresses to the arbitrator block 112 via lines 104 and 108. A Joint Test Action Group ("JTAG") interface 114, JTAG circuitry 116, and TAP 118, are coupled to the processor core 102 through an internal bus 120. The JTAG interface 114 and circuitry 116 are provided to interpret JTAG signals received over TAP 118.

The TAP 118 enables the digital microprocessor 100 to connect to other external serial JTAG devices directly, for component test and debug purposes, or for connection to a test bus that interconnects other JTAG circuitry in a computer system for conventional uses such as system monitoring and programming.

Information concerning the digital microprocessor 100 is stored in a Boundary Scan Register ("BSR") 122, which has a plurality of Boundary Scan Cells ("BSC") 124. The BSR 122 may be coupled to the JTAG components through lines 126. The JTAG interface 114, circuitry 116, and TAP 118, with the BSR 122, form a boundary-scan architecture with a cell 124 for every input/output ("I/O") pin, or the boundary, on the integrated-circuit device 100.

The benefit of this architecture is the ability to have fault isolation at the component level. Conventionally, the fault isolation allowed placing a known value on an output buffer of one device and observing the input buffer of another interconnected device to indicate broken circuit traces, cold solder joints, solder bridges, or electrostatic discharge (ESD) induced failures.

The TAP 118 uses a serial synchronous data exchange protocol and has five signal lines: Test Data Input ("TDI"); Test Data Output ("TDO"); Test Port Clock ("TCK"); Test Mode Select ("TMS"); and Test Port Reset (TRST#). The TDI signal is a serial bit stream that goes into either the JTAG circuit control/command registers or the BSR 122 that controls the pin drivers register on the processor core 102. The TDO signal is a serial bit stream that goes to the test bus (or tester circuit coupled to the TAP 118), and contains information shifted out of the identifier register of the BSR 122. The TCK signal is a synchronous clock that accompanies data transfers through the TAP 118.

Data on the input line TDI is sampled on the rising edge of the TCK signal. Data on the output line TDO is sampled on the falling edge of the TCK signal. The TMS signal, used in conjunction with TDI, controls the state machine of the JTAG that determines the state of the TAP-related circuitry and the direction of data streams within the digital microprocessor 100. The TRST# is an optional signal that resets the TAP state machine to a predetermined initial state.

The TAP 118 is a small controller design, driven by the TCK input, which responds to the TMS signal input. A test bus uses both clock edges of the TCK signal. The TMS and TDI signals are sampled on the rising edge of the TCK signal. The TDO signal changes on the falling edge of the TCK signal.

A standardized device description language is used to communicate with the JTAG circuitry 116 of the digital processor 100. This language is called Boundary-Scan Description Language ("BSDL"), which captures the essential features of the IEEE standard 1149.1 implementation. The BSDL, is described in IEEE standard 1149.1b, which is incorporated by reference herein.

Figure 2:
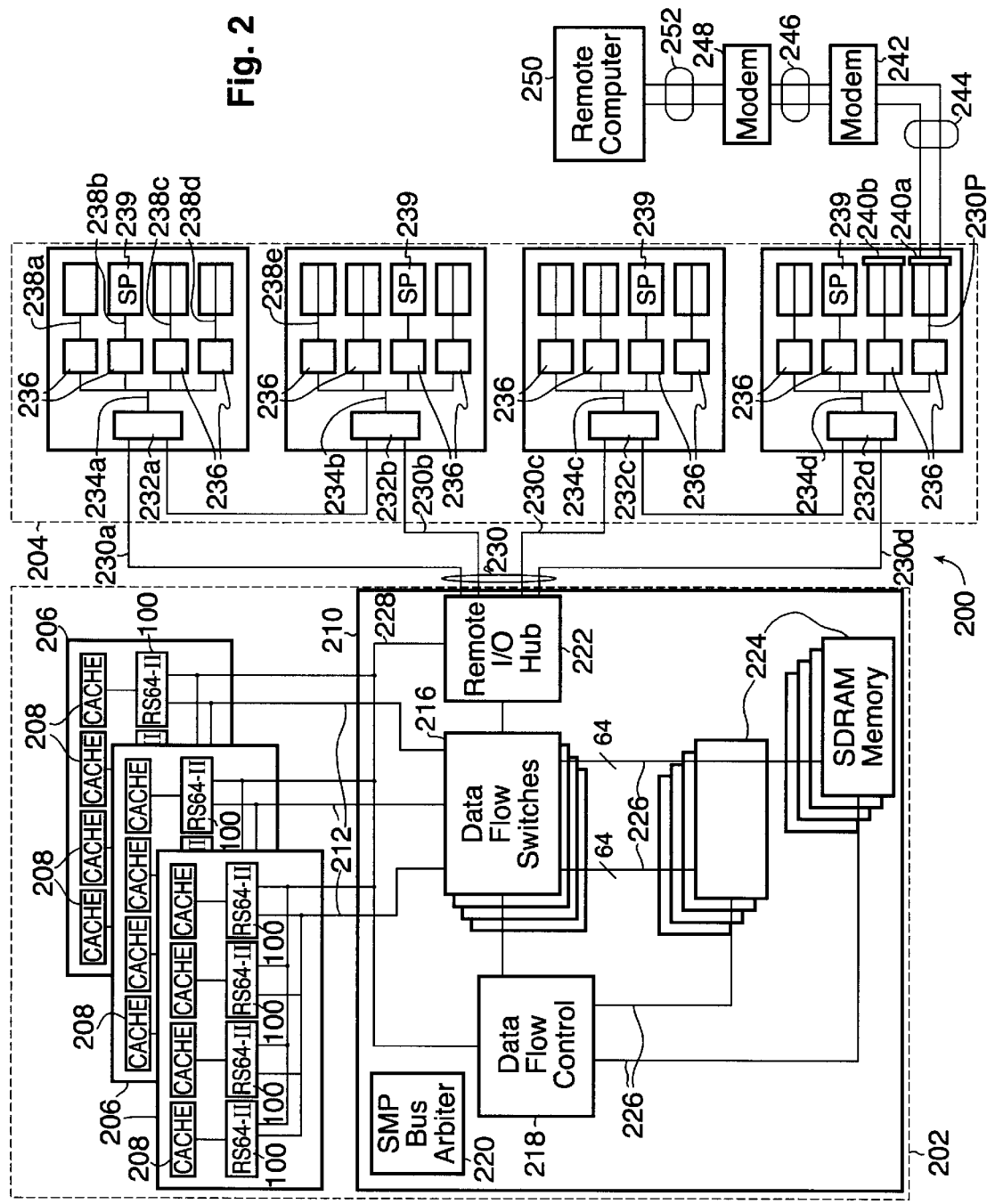
FIG. 2 is a block diagram of a computer system incorporating the remote retrieval of integrated-circuit state information data of the present invention.

FIG. 2 shows a block diagram of a computer system 200 incorporating the remote retrieval of integrated-circuit state information of the present invention. The computer system 200 depicted is a complex server system that exemplifies the need for a remote retrieval of state information of the components to expedite servicing of this complex machinery, as well as to reduce expenses associated with travel and downtime while servicing such complex systems. These high-performance systems are used by banks, manufacturers, retailers, hospitals, or other enterprises that operate on-line transaction processing, or mission-critical electronic-business applications.

Remote retrieval of an integrated-circuit state according to the present invention uses a remote input/output ("RIO") processor with a test circuit interface which in one embodiment is the TAP 118. The test circuit interface is for electrically-coupling to an integrated circuit having a test circuit with at least one register for storing a state-information with respect to the integrated circuit. The RIO processor executes a program that instructs the RIO processor to retrieve the state-information in response to a request command. The retrieved state information is transmitted for analysis at a location remote from the computer system using a data-and-instruction communication device.

The term "remote" as used herein means not in the immediate vicinity of the computer system, the computer system being remotely accessible by another device located in another place (being a room, building, city, state, or country) that is accessible through some type of cable or communications link.

In FIG. 2, the computer system 200 has a Central Electronics Complex ("CEC") 202 and an I/O drawer 204. The CEC 202 contains processor cards 206 having processors 100. The processors 100 may be PowerPC RS64-II processors that are commercially available from the IBM Corporation of Somers, N.Y. The RS64-II processor operates at about 262 MHZ, and has separate 64 kilobyte caches for instructions and data. The RS64-II processor has a Level 2 cache controller and a dedicated 32-byte interface to a private 4-way set associative 8 megabyte Level 2 cache.

The processors 100 are arranged in a Symmetric Multi-Processing ("SMP") architecture for high-end commercial performance, which can be provided in a four, eight, and twelve processor configuration. The computer system 200 shown in FIG. 2 is a twelve processor configuration.

The processor cards 206 have level-2 cache memory 208, each having a size of about 8 megabytes. The processor cards are electrically-coupled to a memory controller complex 210 through three SMP system data buses 212, which are configured to run at a speed consistent with the processor 100. A fourth SMP system data bus 212 is coupled to an remote input/output ("RIO") hub chip 222. The computer backplane is provided by the data flow switches 216, data-flow control chip 218, and SMP bus arbiter circuit 220.

A backplane is understood to be a pathway on which electrical signals travel between devices, similar to a bus. Unlike a bus, however, a backplane serves to connect devices having disparate component architectures. The arbiter circuit 220 monitors and manages competing demands for bus resources, such as memory or pathways, made by the multiple processes of the computer system 200.

The SDRAM memory 224 is electrically coupled to the data flow switches through 64-byte data paths 226. Addressing of the SDRAM memory 224 is addressed through memory address lines 226.

The processor cards 206 are coupled to a system bus 228, which provides information between the data flow control chip 218, the RIO hub 222, and the SMP bus arbiter 220. The system bus 228 uses a 128-bit data path and a separate 64-bit address path. Address, data, and control are parity checked, and transfer sequences are validity checked by the system bus 228. Also, the system bus 228 provides a test bus that interfaces with the JTAG test circuitry 116 through the TAP 118 of the processors 100 (see FIG. 1). The RIO bridge bus chips 232a, 232b, 232c, and 232d convert the respective RIO connections 230a, 230b, 230c, and 230d to the local mezzanine busses 234a, 234b, 234c, and 234d.

The mezzanine busses 234a, 234b, 234c, and 234d provide a reduced signal version of the system bus 228 that has been optimized for input/output purposes, as well as the ability for access to the test bus component of the system bus 228.

The I/O drawer 204 is connected to the system bus 228 through the RIO hub chip 222, which supports four RIO connections 230a, 230b, 230c, and 230d. The RIO connections 230 are scalable high-speed, point-to-point interfaces having low latency, high-bandwidth connections between the CEC 202 and the I/O drawer 204. The RIO connections 230a, 230b, 230c, and 230d are configured as loops so that the RIO hub chip 222 directs data traffic around the loop in an optimal fashion for performance, and will redirect traffic if link errors occur.

The PCI bridge chips 236 convert the mezzanine bus busses 234a, 234b, 234c, and 234d to PCI local busses 238a through 238p. PCI is a specification that defines a local bus system for a computer built to the PCI specification. The PCI local bus requires the presence of a PCI controller card, which must be installed in one of the PCI-compliant slots. The PCI controller card is provided with RIO processor 239, which is a Service Processor ("SP") having a firmware program executed by the SP. The RIO processor 239 is a microprocessor preferably having high-speed performance and computational power sufficient to accommodate control of the PCI local bus, and to accommodate requests relating to maintenance and servicing of the CEC 202. A suitable microprocessor is the PowerPC 603, available from the IBM Corporation.

Through the PCI busses, serial ports 240a and 240b are provided. Other communication ports are also available in the ISDN (Integrated Services Data Network) port, or a T1 trunk port. An ISDN provides for a worldwide digital communications network evolving from existing POTS (Plain Old Telephone System) line telephone services. ISDN seeks to replace these systems with totally digital switching and transmission facilities capable of carrying data ranging from voice to computer transmissions, music, and video. A T1 line is a communications line having a larger telephony bandwidth than the POTS lines commonly used in the home, for example.

The remote retrieval of an integrated-circuit state is performed through the serial ports 240. This serial ports 240 provide a serial interface that sends data and control bits sequentially over a single transmission line. The connection is through the use of an RS-232 or RS-442 interface standard.

The RS-232-C standard, which is incorporated by reference herein, is an accepted industry standard for serial communications connections that has been adopted by the Electrical Industries Association ("EIA"). This Recommended Standard ("RS") defines the specific lines and signal characteristics used by serial communications controllers to standardize the transmission of serial data between devices. The designation "C" denotes that version of the standard is the third in a series.

As shown in FIG. 2, the serial port 240a is electrically coupled to a modulator/demodulator ("modem") 242 using a serial cable 244. The modem 242 is operated through communications software programs known by those skilled in the art. Accordingly, the operation of a modem and associated communications software is not discussed in further detail. Simply put, the modem 242 enables the computer system 200 to transmit information over a POTS telephone line 246. Because a computer is a digital device, and a POTS telephone line is an analog device, the modem 242 is needed to convert digital information from the computer system 200 to an analog signal. The analog signal transmitted over the telephone line 246 is received by the remote modem 248, which converts the analog signal back into a digital signal for processing by the remote computer, or service center, 250. The remote computer 250 is a workstation, which is a powerful stand-alone computer. But other less powerful computers such as a Personal Computer ("PC") can be used.

When a component failure is detected in the CEC 202, the RIO processor 239 can auto dial-out to a service center 250 without an operator initiation so that preventative maintenance measures can be taken in an effort to prevent an outage of the computer system 200.

Remote maintenance and diagnostics functions, include console mirroring from a remote site 250, enable dial-in by a service technician who can reboot and restore the system 200 as soon as possible after a failure, or correct a potential malfunction before it occurs. To do so, the service technician needs additional information concerning the state of the computer system 200 with respect to the failure.

FIG. 3 is a flow chart 300 of the interaction between the RIO processor 239 of the computer system 200 and the remote site 250 across the data-and-instruction communication device, illustrated as a phantom line. As needed, reference is made back to FIG. 2 with respect to the actions being taken with respect to the invention, wherein the data-and-instruction communication device is provided by the serial port 240a, serial cable 244, and the modem 242. The data-and-instruction communication device is coupled to the remote site 240 through a telecommunications network 246, the remote site modem 248, and remote serial cable 252.

The flow chart of FIG. 3 illustrates the flow of the present invention with respect to the remote retrieval of an integrated-circuit state. The flow is for issuing a request command for state-information of an integrated circuit, retrieving the state-information in response to the request command, and transmitting the state-information to a remote location, such as the remote terminal 250.

In step 302, the computer system 200 is in an operational or running mode. If at step 304, a system failure has occurred in the computer system 200, then the RIO processor 239 transmits a system failure message to the remote site 250 at step 306. Otherwise, the system continues in its operational mode at step 302.

The remote terminal 250 receives the system failure message at step 308, and at step 310, transmits a command request to the RIO processor 239. The command request is a request for the state information of the CEC 202. The request can be for state information of all the JTAG-compliant devices in the CEC 202, or for a specific JTAG-compliant device. In this manner, the requested information can be tailored to the probable cause of a system failure. The transmission can be made manually by a service technician in view of the system failure message received, or can be an automated process executed by the remote site 250 according to a protocol responsive to the particular received system failure message. Furthermore, it should be noted that the service technician can issue a command request without the existence of any system failure of the computer system 200. Such information is useful in routine maintenance of the computer system 200, as well as to provide a preventative aspect to maintaining the computer system 200.

Upon receiving the command request from the remote site 250, at step 312, the RIO processor 239 issues a data retrieval command request in response. The data retrieval command request is issued to the system bus 210 of the CEC 202.

Through the system bus, the state information of the JTAG-compliant devices is retrieved at step 314 and provided to the RIO processor 239, which formats the state information at step 316 into a more readily discernable format for the service technician at the remote site 250. Step 316 can be an optional step, as the unformatted state information data can be streamed to the remote site 250. It should also be noted that the formatting can take place at the remote site 250, but is conducted by the RIO processor 239 due to the ability to focus system resources to the data formatting task.

At step 318, the formatted state information data is written to the serial port 240, and transmitted at step 320 to the remote site 250, where the data is received at step 322. When received by the remote site 250, the data can be displayed on a monitor for review, stored as a data file, or further processed by the remote site 250 for further analysis by the service technician.

Although the present invention and its advantages have been described in detail, it should be understood that various changes, substitutions and alterations can be made herein without departing from the spirit and scope of the invention as defined by the appended claims.

What is claimed is:

1. An apparatus for remote diagnostics and maintenance of a multiprocessor (MP) system comprising:

an MP Central Electronics Complex (CEC), said CEC comprising a plurality of processors coupled on a first bus, each of said plurality of processors comprising an integrated circuit (IC);

a serial scan test port in each of said ICs, said serial scan test port coupled to scan registers in said ICs, each of said serial scan test ports on each IC coupled with a scan test bus;

a remote input/output (RIO) processor, said RIO processor coupled to said plurality of processors on said first bus, said RIO processor having said serial scan test port, said serial scan test port coupled to said ICs on said scan test bus, further said RIO processor coupled to a communication link via a modulator/demodulator (MODEM), said MODEM operable to communicate with a remote analysis station;

a first routine for executing operations of said CEC using said first bus; and a second routine for executing operations using said scan test bus, said RIO processor concurrently executing said first and second routines.

2. The apparatus of claim 1, wherein said RIO processor formats and sends results of the executing of said first and said second routines via said MODEM to said remote analysis station, said RIO processor receiving operation requests for said second routine from said remote analysis station and said first routine.

3. The apparatus of claim 2, wherein said second routine is a diagnostic routine operable to format and send instructions and data from said first bus operations to said remote analysis station via said MODEM in response to said operation requests.

4. The apparatus of claim 3, wherein said RIO processor is programmed to automatically execute said diagnostic routines in response to said en-or condition of said CEC system.

5. The apparatus of claim 3, wherein said data and instructions of said first bus operations minors an I/O console display of said MP to said remote analysis station.

6. The apparatus of claim 2, wherein said second routine is operable to send and receive scan register data of said ICs on said scan test bus in response to said operation requests.

7. The apparatus of claim 2, wherein said operation request is a received error condition from said first routine.

8. The apparatus of claim 2, wherein a first operation of said second routine, in response to one of said operation requests, signals the execution of a second operation of said first routine.

9. The apparatus of claim 8, wherein said request comprises a remote analysis station request for a reboot of said CEC system.

10. The apparatus of claim 2, wherein said operation request comprises a remote analysis station request for a CEC system status, a processor status or an IC scan register content.

11. The apparatus of claim 1, wherein said first bus is a Peripheral Component Interface (PCI) bus.

12. The apparatus of claim 1, wherein said serial scan test port is a Joint Test Action Group (JTAG) compliant serial scan port.

13. The apparatus of claim 1, wherein said scan test bus is a JTAG compliant bus operable to interconnect said serial scan test ports.

14. The apparatus of claim 1, wherein said scan registers contain a status of said CEC.

15. The apparatus of claim 1, wherein said scan registers contain a status of one of said processors.

16. The apparatus of claim 1, wherein said scan registers contain a status of one of said ICs.

17. The apparatus of claim 1, wherein said first routine controls operations of said first bus for said CEC in said MP.

18. The apparatus of claim 1, wherein said RIO processor formats retrieved contents from said scan registers into diagnostic message data for sending to said remote analysis station.

19. A method for remote diagnostics and maintenance of a multiprocessor (MP) system having a plurality of processors in a central electronic complex (CEC), said method comprising the steps of:
- coupling said plurality of processors on a first bus, each of said plurality of processors comprising an integrated circuit (IC);
- coupling a serial scan test port of said ICs with a scan test bus, said scan test port further coupled to scan registers in said ICs;
- coupling a remote input/output (RIO) processor to said first bus with an operations port, said RIO processor further coupled to said scan test bus with one of said serial scan test ports, said RIO processor coupled to a communication link via a modulator/demodulator (MODEM), said MODEM operable to communicate with a remote analysis station;
- executing a first routine in said RIO processor, said first routine executing operations of said CEC on said first bus; and
- executing a second routine in said RIO processor in response to requests from said remote analysis station and said first routine, said second routine executing operations on said scan test bus.

20. The method of claim 19, wherein said RIO processor formats and sends results of the executing of said first and said second routines via said MODEM to said remote analysis station, said RIO processor receiving operation requests for said second routine from said remote analysis station and said first routine.

21. The method claim 20, wherein said second routine is a diagnostic routine operable to format and send instructions and data from said first bus operations to said remote analysis station via said MODEM in response to said operation requests.

22. The method of claim 21, wherein said RIO processor is programmed to automatically execute said diagnostic routines in response to said error condition of said CEC system.

23. The method of claim 21, wherein said data and instructions of said first bus operations mirrors an I/O console display of said MP to said remote analysis station.

24. The method of claim 20, wherein said second routine is operable to send and receive scan register data of said ICs on said scan test bus in response to said operation requests.

25. The method of claim 20, wherein said operation request is a received error condition from said first routine.

26. The method of claim 20, wherein a first operation of said second routine, in response to one of said operation requests, signals the execution of a second operation of said first routine.

27. The method of claim 26, wherein said request comprises a remote analysis station request for a reboot of said CEC system.

28. The method of claim 20, wherein said operation request comprises a remote analysis station request for a CEC system status, a processor status or an IC scan register content.

29. The method of claim 19, wherein said first bus is a Peripheral Component Interface (PCI) bus.

30. The method of claim 19, wherein said serial scan test port is a Joint Test Action Group (JTAG) compliant serial scan port.

31. The method of claim 19, wherein said scan test bus is a JTAG compliant bus operable to interconnect said serial scan test ports.

32. The method of claim 19, wherein said scan registers contain a status of said CEC.

33. The method of claim 19, wherein said scan registers contain a status of one of said processors.

34. The method of claim 19, wherein said scan registers contain a status of one of said ICs.

35. The method of claim 19, wherein said first routine controls operations of said first bus for said CEC in said MP.

36. The method of claim 19, wherein said RIO processor formats retrieved contents from said scan registers into diagnostic message data for sending to said remote analysis station.

* * * * *

UNITED STATES PATENT AND TRADEMARK OFFICE
CERTIFICATE OF CORRECTION

| | |
|---|---|
| PATENT NO. | : 6,282,674 B1 |
| DATED | : August 28, 2001 |
| INVENTOR(S) | : Jayesh M. Patel and Maulin I. Patel |

It is certified that error appears in the above-identified patent and that said Letters Patent is hereby corrected as shown below:

<u>Column 8,</u>
Line 33, "en-or" should be -- error --.

Signed and Sealed this

Seventh Day of May, 2002

*Attest:*

*Attesting Officer*

JAMES E. ROGAN
*Director of the United States Patent and Trademark Office*